Figure 1:
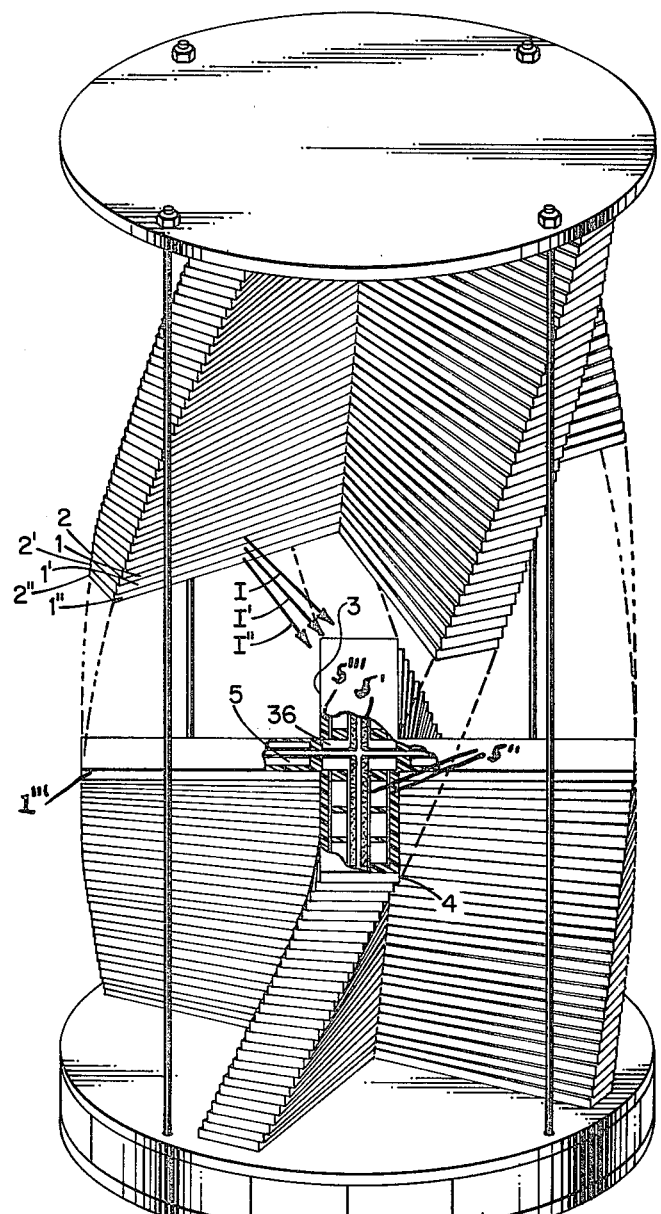

United States Patent [19]

Klein

[11] 4,202,050
[45] May 6, 1980

[54] MULTI-ANGULAR SECTOR SOUND TRANSMITTING AND RECEIVING SYSTEM

[76] Inventor: Martin Klein, Rte. 111 - R.F.D. 2, Salem, N.H. 03079

[21] Appl. No.: 880,641

[22] Filed: Nov. 28, 1969

[51] Int. Cl.[2] .......................... G01S 9/68; G01S 3/84
[52] U.S. Cl. .................................. 367/105; 367/113; 367/122; 367/155
[58] Field of Search .................. 340/3 C, 3 R, 6 R, 9, 340/10, 16 R

[56] References Cited
U.S. PATENT DOCUMENTS

| 3,506,953 | 4/1970 | Rudy | 340/6 R X |
| 3,568,141 | 3/1971 | Schwarz et al. | 340/6 R |

Primary Examiner—Richard A. Farley
Attorney, Agent, or Firm—Rines and Rines

[57] ABSTRACT

This disclosure relates to multi-angular sector sound transmitting and receiving systems embodying stacked pluralities of arrays of transducers and novel scanning arrangements and circuits for enabling the display of the sound-wave reflections emanating from multiple angular sectors upon a novel preferably spirally deflected cathode-ray-tube display system.

9 Claims, 3 Drawing Figures

MULTI-ANGULAR SECTOR SOUND TRANSMITTING AND RECEIVING SYSTEM

The present invention relates to multiple-angle sector sound transmitting and receiving systems, being more particularly directed to scanning arrays of transducers and synchronously operating displays for presenting the information received by such scanning arrays.

Numerous types of sonar systems have been evolved through the years for enabling the search of areas under the water or to ascertain the presence and location of various obstacles or other objects. Of more recent vintage, sound-wave transmitting and receiving apparatus have been employed for effecting scan in multiple directions to enable a panoramic or more full observation of the underwater area in widely different angular sectors or directions. A successful side-scanning sonar of this type is described, for example, in my article "Side Scan Sonar" appearing in the April 1967 issue of UNDER SEA TECHNOLOGY commencing at page 24. There has developed, however, the requirement for greatly improved resolution and more rapid scanning of widely divergent angular sectors, including 360° or substantial omni-directionality around the vessel or other object taking the sonar soundings. These more stringent requirements can in some instances be at least partially met by rotating transducers of the type described in my said article, though this is relatively slow, expensive and bulky. Electronic or other steering for scanning has been proposed in connection with multiple arrays; but, again, the devices almost invariably involve the use of highly expensive and complicated acoustical delay lines and the like which have seriously limited their application and indeed their resolution and use in practical commercial endeavors.

It is to the solution of this problem, accordingly, that the present invention is primarily directed, it being an object of the invention to provide a new and improved multi-angular sector sound transmitting and/or receiving system that shall not be subject to the above-described disadvantages.

A further object is to provide a novel sound or acoustic wave scanning system of more general utility, as well.

Other and further objects will be explained hereinafter and are more particularly pointed out in connection with the appended claims. In summary, however, from one of its broadest aspects, the invention contemplates a multi-angular sector sound system, having a plurality of adjacent sets of stacked pluralities of arrays of sound-to-electric energy transducers, each array of a set comprising a line of a plurality of successively disposed transducers, the successive line arrays of each set being stacked one upon another in a direction normal to said array lines and with successive array lines twisted at successive angles to the preceding array line to define an angular sector over the set of arrays, with each successive array line corresponding to successive angles within that sector and with each set being oriented with respect to an adjacent set to define an adjacent angular sector. Preferred constructional details are hereinafter set forth as are scanning and related mechanisms and circuits that are of particular significance in connection with stacked arrays of the above-described character, though also of more general applicability, as well.

Figure 2:
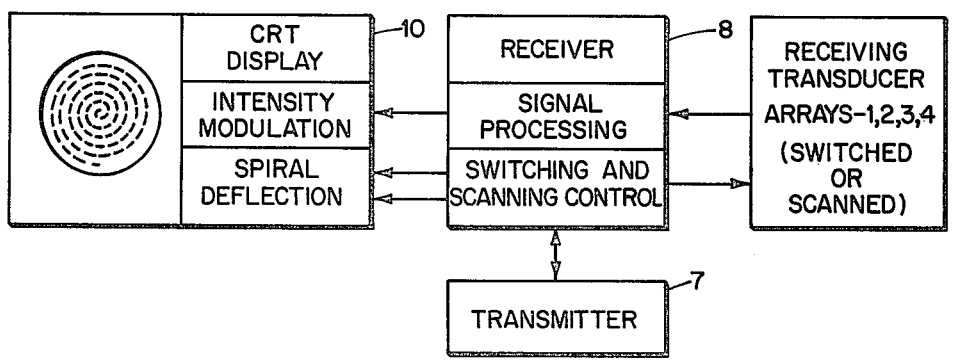
Figure 3:
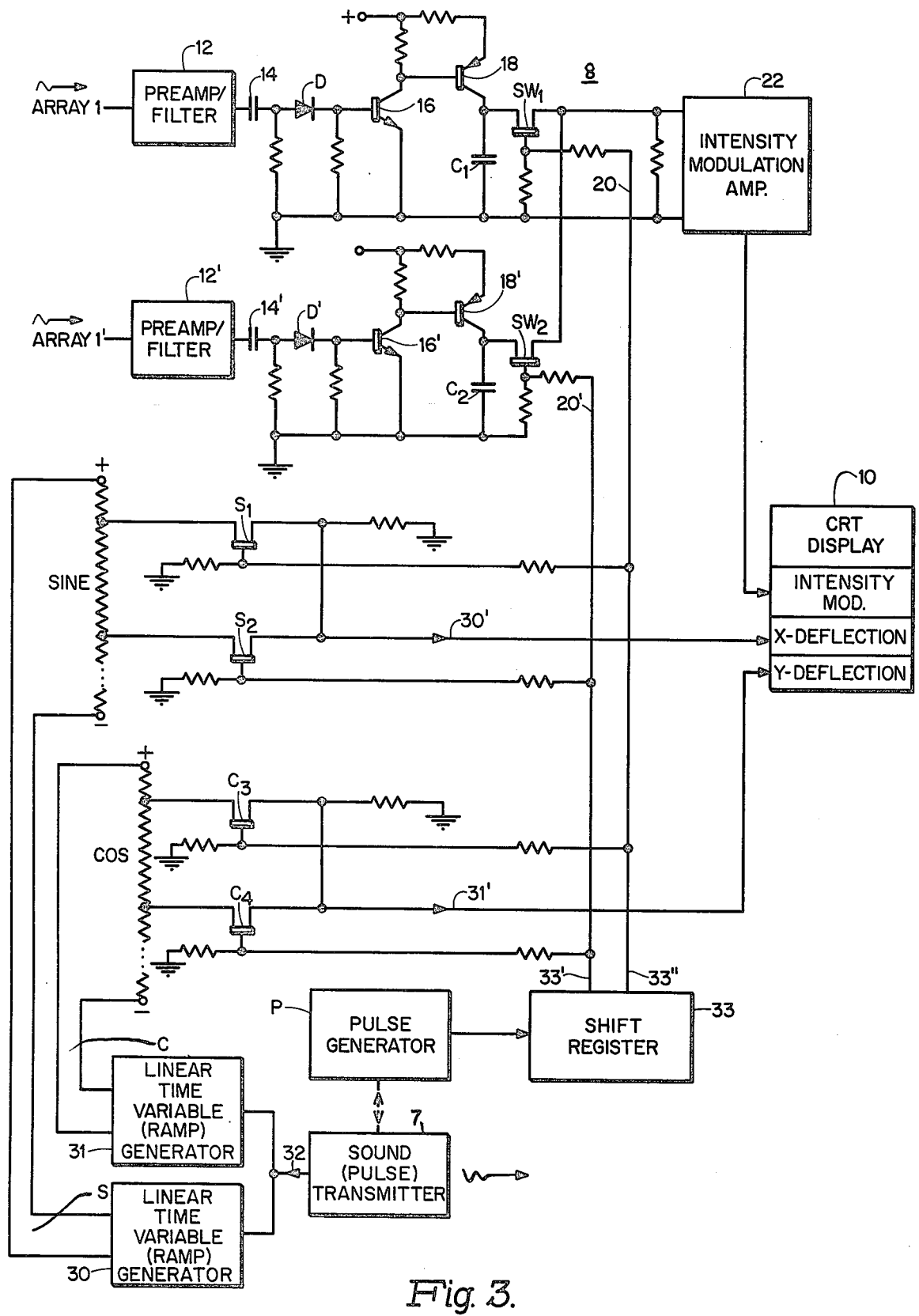

The invention will now be described with reference to the accompanying drawing,

FIG. 1 of which is an isometric view, partly broken away to illustrate details of construction, showing a preferred embodiment of a multiple angular sector sound transmitting-receiving system constructed in accordance with the present invention;

FIG. 2 is a generalized block diagram of a preferred system employing the scanning system of FIG. 1; and FIG. 3 is a partial block and circuit diagram illustrating preferred circuits useful in the system of FIG. 2, as well as in other applications.

Referring to FIG. 1, an array of transducers for underwater use is illustrated in the form of four adjacent sets of stacked pluralities of arrays of sound-to-electric energy transducers. A first such set is shown at 1, 1', 1", ... 1''', etc., each array being illustrated in the form of a line of a plurality of successively positioned transducers, such as the front line of piezoelectric crystals 5 associated with the linear array 1'''. The successive line arrays 1, 1', 1", etc. of each set of arrays are shown stacked one upon the other in the vertical direction normal to the array lines, with the successive arrays 1, 1', 1", etc. twisted at successive angles to the preceding array to define an angular sector (in a general direction to the lower right in FIG. 1) over which the set of arrays is to operate, and with each successive array corresponding to successive angles in that angular sector. In FIG. 1, thus, the direction I indicates the direction of the principal narrow directional lobe of the array 1, pointing to the right and downward; the next successive array 1' has its principal lobe direction at the next successive angle I'; and the next array 1", at the next successive angle I", and so on. The arrays of this set of arrays 1, 1', 1", etc. are in this embodiment disposed back to back with a similar set of arrays 2, 2', 2", etc. that point in directions 180° opposite to the respective angles I, I', I", etc.

Third and fourth similar back-to-back sets of pluralities of arrays pointing in the remaining angular sectors not covered by the sets 1, 1', 1", etc. and 2, 2', 2", etc. are shown respectively at 3 and 4. Thus, substantially 360° of angular sectors are covered by the respective sets of arrays, each one defining substantially 90° adjacent the angular sector of the sets of arrays adjacent thereto.

In accordance with the present invention, the arrays of these successive sets are successively periodically switched or scanned and the signals received thereby are fed to an appropriate display such that the operator may have a 360° panoramic view of all sonar-detected objects surrounding the location of this sonar system. While the arrays 1, 1', etc., 2, 2', etc., 3 and 4 are illustrated as receiving transducers, they can operate both for purposes of transmission and reception; though in the preferred embodiment of FIG. 1, a separate omni-directionally operating set of transmitter transducers is shown at 7 descending below the structure supporting the scanned receiving elements. For purposes of the invention and for efficiency, it is important that the sound transmissions be spread out in areas that are fully covered by the sound-receiving array; and since this array covers the 360° sector, this end is achieved.

As more particularly shown in FIG. 2, the sound echoes received by the receiving system 1-2-3-4 is applied to a receiver generally indicated at 8, including signal-processing circuits and scanning and switching control circuits hereinafter discussed. These, in turn, provide synchronization with and control of a display generally illustrated at 10, preferably of the cathoderay-tube type, though not essentially thus, and having preferably a spiral deflection presentation, as illustrated, with intensity modulation thereupon such that the indications on the display of the sound received by the multiple angular sector arrays will occur in angular orientations corresponding to the actual angles of reception of the individual scanned arrays, as later more fully discussed.

Long-persistence screens are preferred since the effect can then be attained, particularly with fast enough scanning, that the picture appears to stand still. This is in marked contrast with many sonar systems which present blinking, sweeping, or periodically flashing displays.

The problem of effecting a rapid enough scan of these multiple arrays of elements is a serious one inasmuch as the required speeds of scan, as integrated into the display taxes the state of the art in connection with switching circuits and similar devices. The present invention obviates this problem, however, in a rather unique manner.

If the range of the sonar, for example, is to be 100 feet, corresponding to a sonar reflection and return time of 40 milliseconds under water, and a 360° scan is to be attained, as in the preferred example before-discussed, together with a spiral scan presentation on the cathode-ray-tube of, say, the order of 500 lines, then the time for each switching function or feeding of the information from such successive arrays of the receiving system is of the order of 0.2 microsecond. If true signal sampling is to be employed, still faster scanning is required and this puts demands upon switching and the like that are extremely stringent and probably today somewhat beyond the state of the art. Since it is desired, in this spiral display scan, to present something approximating to a real-time look at all of the signals occurring throughout the 360° area, even on shorter ranges, it is probably beyond the realm of present-day technology to effect switching at the desired and necessary rate and to effect the presentation in this type of display such that an instantaneous and continuous picture of what is being echoed in the complete 360° area is substantially simultaneously to be attained.

In accordance with the present invention, however, circuits and techniques are offered which allow for something analogous to real-time presentation with the aid of a unique combination of storage and switching. Referring, for example, to FIG. 3, the successive arrays 1 and 1' (as illustrations) are shown connected with appropriate circuitry for accomplishing this end. The array 1 is connected to a preamplifier and filter 12, which may serve the function of limiting the bandwidth and filtering out unnecessary noise as well as raising signal level for processing. The received signal is passed from 12 through coupling capacitor 14 to a rectifying circuit illustrated in the simple form of a series diode D, and is then applied to an amplifier 16, illustrated in the form of a grounded emitter transistor stage the collector of which is shown feeding the base of a further transistor 18 that is operated as a current source in order to enable the building up of the rectified received sonar signal voltage across an integrating capacitor C1. Through the use of this integrating circuit at the stage 18, the energy resulting from the transducing of sound signals received by the array 1, is stored in an integrated step-DC-level manner in capacitor C1; and this is done simultaneously for all of the other arrays, such as the array 1', shown similarly connected through preamplifier-filter 12', capacitor 14', rectifier D' and stages 16' and 18', to have its energy stored in integrator capacitor C2; and so on. The DC-level information thus stored is then sequentially switched successively from the integrating capacitors C1, C2, etc., of the successive arrays 1, 1', etc. under the control of circuits hereinafter explained, and preferably through the medium of a plurality of switching devices of the solid-state gating type, such as field effect transistor (FET) switches SW1 and SW2, illustrated respectively associated with integrating capacitors C1 and C2. Advantages of the use of FET switches in this process, of course, reside not only in the lack of inherent voltage drop in such devices, but in the large on-off ratio characteristics and the excellent gating isolation provided by the high input impedance of such devices. Clearly, however, other types of switching mechanisms may be used, though they are not considered so desirable for the present purposes.

When it is desired to switch the array 1, the normally ineffective switching stage SW1 will be gated by a signal applied to its gate through the input lead 20, whereupon the DC signal voltage will be processed into a pulse corresponding to the amount of DC-level information stored in capacitor C1 and passed to a common intensity-modulation amplifier 22 in the receiving system 8 to intensity modulate the grid or other circuitry associated with the cathode-ray-tube display, so labelled in FIG. 3, in well-known fashion.

Similarly, when the next successive array, such as the array 1', is to be switched, the corresponding switching stage SW2 will be rendered effective, as by a gating signal applied at conductor 20' to the gate of the FET SW2; and, similarly, a pulse will result corresponding to the energy integrated in the storage capacitor C2. This pulse will intensity-modulate the electron beam of the display 10 when the beam has moved to another region along the spiral trace, as hereinafter described, corresponding to the angular orientation of the array 1', as distinguished from that of the array 1.

Through this technique of integration-storage in rectified form of the signals from all of the arrays and the successive switching of the stored signals and processing of the same for intensity modulation purposes, the problems above-stated can be obviated. Particularly with a high persistence phosphor, a spiral display can present, substantially instantaneously and in a static picture, a view of all of the objects detected by the successively scanned omni-directional arrays 1-2-3-4. More than this, with this storage technique, all of the received data of the array is captured and there is 100% storage retrieval, as distinguished from many of the sampling and other systems heretofore proposed.

It remains to explain how the spiral display can be produced and coordinated for use with this type of switching or scanning circuit. Again referring to FIG. 3, sine and cosine resistor chains or networks (SINE, COS) are illustrated having respective tap-off points for producing successive voltages that are ultimately to be applied to the X and Y deflection mechanisms of the cathode-ray-tube, so as to produce a circular trace. At each of these successive points along the sine and cosine networks, corresponding to successive points in a circular trace that would result if these incremental voltages were directly applied to the deflection means of the cathode-ray-tube 10, there are disposed further gates, again shown in the form of FET switches S1, S2, etc. and C3, C4, etc., associated with the respective sine and cosine network chains. When the successive gates S1, S2, etc. and C3, C4, etc. are operated, the required voltages for producing the positioning of the electron beam at different points of the 360° of the display is effected. In order to cause this to move out in spiral fashion, the outputs of the portions of the sine and cosine networks that are thus available through gating, are modified by voltages applied respectively by conductors S and C from linear time-variable generators, such as ramp-sweep generators illustrated respectively at 30 and 31. The output of the sine and cosine networks are applied by conductors 30' and 31' to the X and Y deflection means of the cathode-ray-tube display for generating the successive points of spiral scan thereupon since the ramp function pushes the otherwise circular deflection radially outward to form the spiral scan. Since this scan is to be produced for each transmitter pulse, synchronization of the time of operation of the linear time-variable ramp generators is effected from the sound pulse transmitter circuit, as shown by the reset and blanking connection feedback paths 32.

The time at which the electron beam is to be intensity modulated, moreover, is to be synchronously adjusted with the time at which the appropriate array is switched and has its received signal applied through the intensity-modulation amplifier 22 to the cathode-ray-tube display. There must be synchronization, thus, between the positioning of the successive spots defining the spiral scan and the angular orientation of the particular receiving array being displayed. This is shown effected under the control of a pulse generator P which applies pulses to a plurality of shift registers 33, the outputs from successive registers of which are applied to the successive switching or gating elements SW1, SW2, etc., of the sets of arrays of receiving transducers and the gating circuits S1, S2, etc. and C3, C4, etc. of the respective sine and cosine deflection generating networks. Thus, for example, the shift register output 33" is shown applied by conductor 20 for switching the gate SW1 and the corresponding first array 1, and also to switching gates S1 and C3 of the respective sine and cosine resistor networks. The next output 33' of the shift register 33 is similarly shown applying a gating signal synchronously to the gate SW2, switching the second array 1', and the next gating elements S2 and C4 along the respective sine and cosine networks, and so on.

As an example of a successful experimental sonar of this type, arrays such as shown in FIG. 1 have been constructed and operated at a frequency of 100 KHZ with piezoelectric crystal arrays about two feet long containing lead zirconate titanate crystals 5 (FIG. 1) about two inches long, a half inch wide, and one eighth to a quarter of an inch thick, sandwiched between rubber, cork and neoprene-covered aluminum absorbing backing 5' and the electrodes 5" for operating the same, all potted in polyurethane 5"'. The resulting beam width in the directional I, for example, in connection with an array 1 of this character, was approximately 1°. The vertical coverage, however, is somewhat broad and this can, if desired, be somewhat directionalized or reduced either by controlling the angular width and orientation (in the vertical sense) of the transmitter transducer 7, or by varying the size of a transmitter array in the vertical direction, as desired. While separate discrete crystals forming the linear array are illustrated, contiguous long crystals can be used for ease of fabrication, which still act as a plurality of successive sub-crystals. Alternatively, the complete system may, if desired, be immersed in an oil bath with a sound transparent dome or window, as of thin fibre glass, steel or pervious sound-rubber and the like.

Clearly, other types of transducers may also be employed to attain similar results; and, indeed, less than a 360° sector may, if desired, be covered by appropriate orientations. Even in the case of 360° coverage, the crossed form of the arrays need not be employed, as it is possible to employ other geometrical configurations, such as squares, single elements, and polygons and the like, to attain similar results. In the system of FIG. 1, however, preamplifier and perhaps other circuits may conveniently be disposed in the center of the system and potted in place for compactness in fabrication, as shown schematically at 36 in FIG. 1. It is also to be understood that the novel storage and switching techniques of the present invention may also be employed in other systems where their features and improved performance are desired.

Further modifications will also occur to those skilled in this art and all such are considered to fall within the spirit and scope of the invention as defined in the appended claims.

What is claimed is:

1. A multiple angular sector sound system for receiving sound waves having, in combination, a plurality of adjacent sets of stacked pluralities of arrays of sound-to-electric energy transducers, each array of a set comprising a line of plurality of successive transducers, the successive line arrays of each set of arrays being stacked one upon another in a direction normal to said array lines and with successive array lines twisted at successive angles to the preceding array line to define an angular sector over the set of arrays with each successive array line corresponding to successive angles within that sector, each set being oriented with respect to an adjacent set to define an adjacent angular sector, and means for switching successive line arrays of successive sets of arrays successively to common receiving means responsive to the electric energy transduced thereby, such that the output of the receiving means provides successive electrical signals corresponding to the sound received by the successive arrays along successive angles over the successive scanned angular sectors.

2. A multiple angular sector sound receiving system as claimed in claim 1 and in which display means is provided having means for scanning a display area corresponding to and synchronously with the scanned angular sector, the display means being connected with the receiving means output and responsive to the signals thereof to indicate upon the display area the sound received over the multiple angular sector in angular orientations corresponding to the angles of reception by the arrays.

3. A multiple angular sector sound receiving system as claimed in claim 2 and in which the display means comprises cathode-ray-tube means provided with a substantially spirally deflected electron beam display and means for intensity modulating the electron beam in response to said output signals.

4. A multiple angular sector sound receiving system as claimed in claim 3 in which each array is connected with an individual integrating circuit for storing as a d.c. level any signal received thereby, each integrating circuit being connected to a corresponding normally ineffective switching means, and means for rendering the plurality of switching means corresponding to the plurality of arrays successively effective to transmit the stored d.c. level information from the successive integrating circuits to amplifying means in the said common receiving means, the amplifying means being connected with the display intensity-modulating means.

5. A multiple angular sector sound receiving system having, in combination with a plurality of arrays of sound-to-electric energy transducers in which each array comprises a line of a plurality of successive transducers, means for switching successive line arrays successively to common receiving means, cathode-ray-tube display means provided with means for scanning a display area corresponding to and synchronously with the switching of the successive arrays, the display means being connected with and responsive to the receiving means to indicate upon the display area the sound received by the arrays and in angular orientations corresponding to the angles of reception by the arrays, the display means being provided with a substantially spirally deflected electron beam display having means for intensity-modulating the electron beam in response to the output of said receiving means, each array being connected with an individual integrating circuit means for storing as a d.c. level any signal received thereby, each integrating circuit being connected to a corresponding normally ineffective switching means, and means for rendering the plurality of switching means corresponding to the plurality of arrays successively effective to transmit the stored d.c. level information from the successive integrating circuit means to amplifying means in the said common receiving means, said amplifying means being connected with the said display intensity-modulating means.

6. A system as claimed in claim 5 and in which the switching means comprises a plurality of switching gates, one corresponding to each integrating circuit means of each array, the spirally deflected electron beam display means comprises sine and cosine deflection-voltage-producing means each having a plurality of switching gates for producing successive deflection points on the display, and sequential timing means for supplying gating signals to successive gates of the pluralities of switching gates.

7. A system as claimed in claim 6 and in which said spirally deflected electron beam display means further comprises ramp voltage means for expanding the spiral deflection.

8. A system as claimed in claim 7 and in which said sequential timing means comprises pulse generating means connected with shift register means having successive outputs connected with successive of the gates of the pluralities of switching gates.

9. A system as claimed in claim 8 and in which sound-transmitting means is provided cooperative with said receiving system for transmitting pulses of sound waves over said sector, the transmitting means being provided with means for synchronizing the pulse transmission with the operation of the said ramp means of the display.

* * * * *